Dec. 4, 1934.  B. L. PETERSON  1,982,754
ROTARY DISK ORIFICE VALVE
Filed Sept. 26, 1933  2 Sheets-Sheet 1
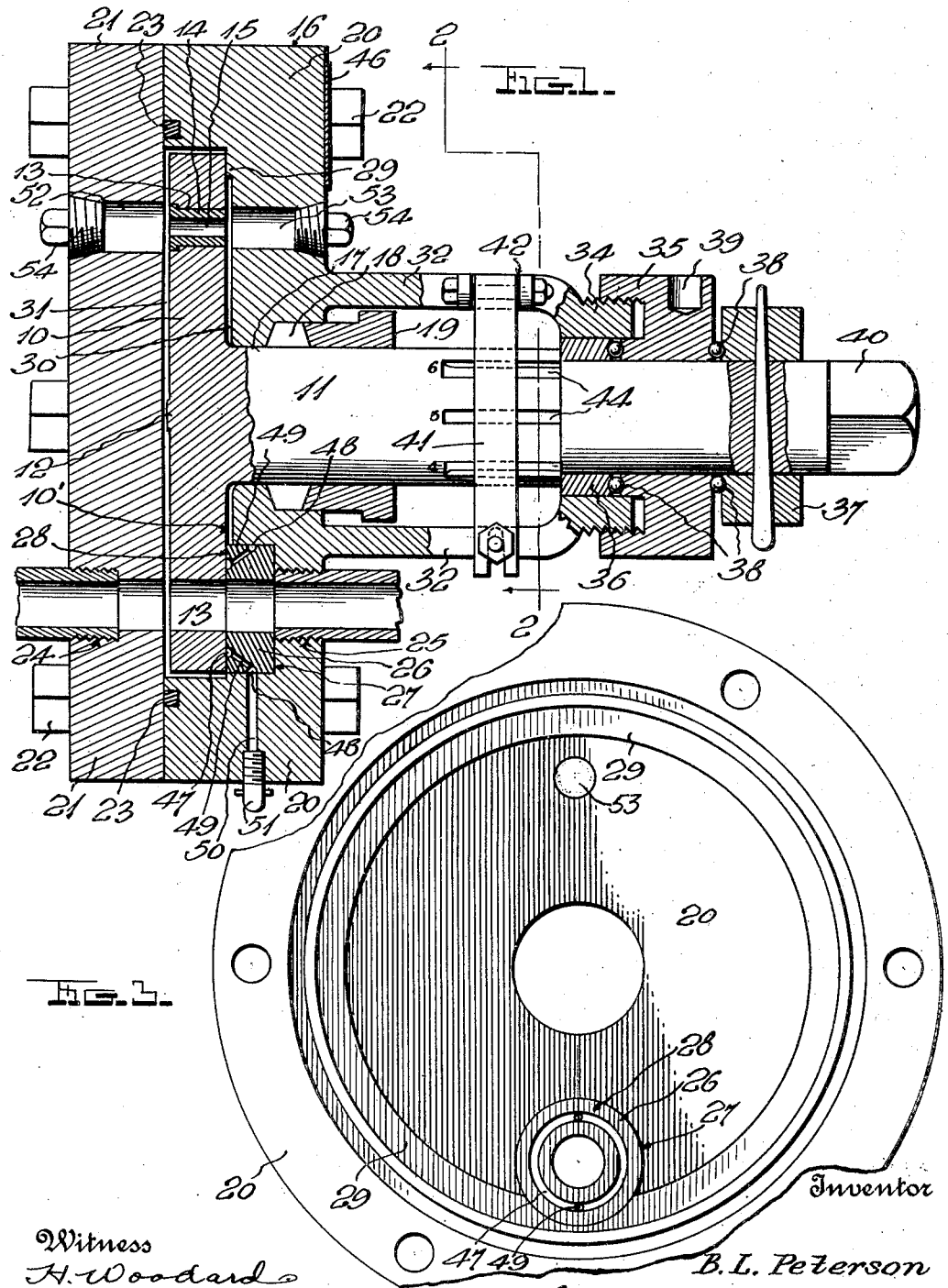

Dec. 4, 1934.  B. L. PETERSON  1,982,754
ROTARY DISK ORIFICE VALVE
Filed Sept. 26, 1933  2 Sheets-Sheet 2
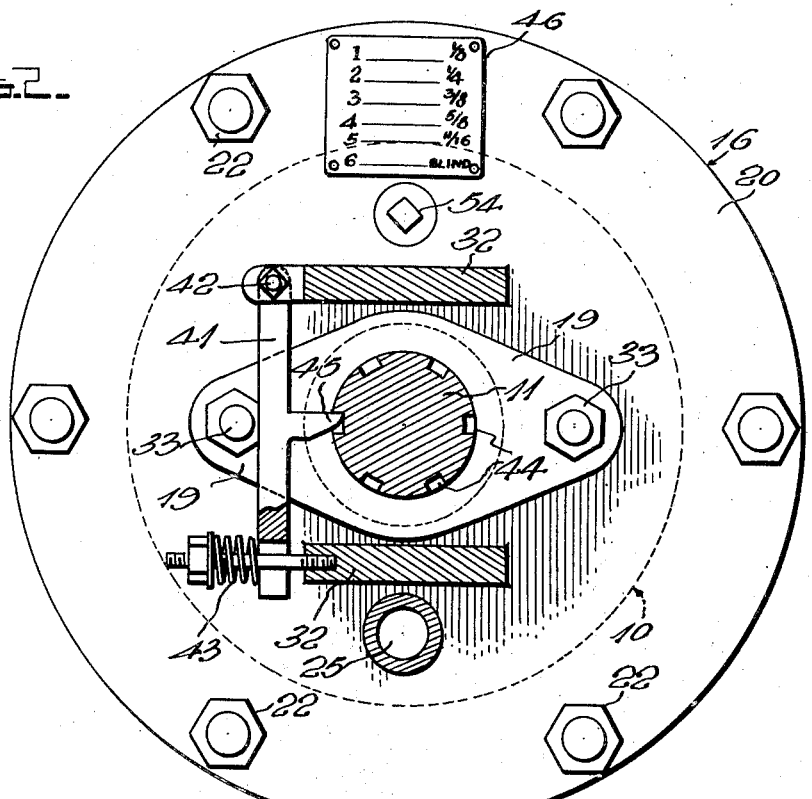
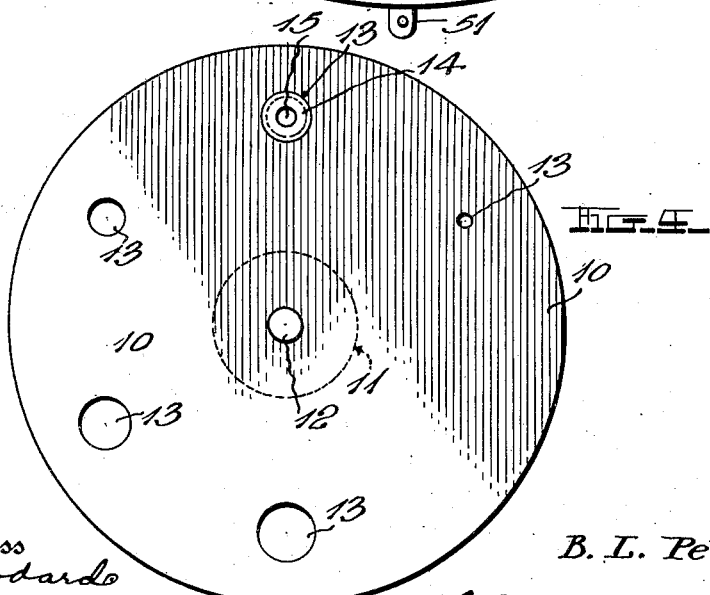
Inventor
B. L. Peterson Patented Dec. 4, 1934

1,982,754

UNITED STATES PATENT OFFICE 1,982,754

ROTARY DISK ORIFICE VALVE

Bert Lawrence Peterson, Wooster, Ohio

Application September 26, 1933, Serial No. 691,043

2 Claims. (Cl. 251—86)

The invention relates to a valve of the type in which a rotatable valve disk having circumferentially spaced openings of different sizes is mounted in a casing having an inlet and an outlet to register with any of said openings, the valve being intended primarily for use on oil and gas wells though not restricted to such use.

Provision is made for forcing the disk against and holding it in tight contact with an annular seat around the fluid outlet of the valve casing, and one object of the invention is to provide a novel structure to prevent springing of the disk upon operation of the forcing and holding means.

A further object is to provide for substantially balancing the valve disk with fluid pressure at its opposite sides, so that said disk may be easily shifted to seat and unseat it, and to rotate it, as required.

The valve disk is carried by a shaft extending to the exterior of the casing through a packed bearing. Co-acting fixed and movable collars are provided to exert endwise pressure on the shaft to seat or unseat the valve disk. The shaft is rotatable to set said valve disk with an orifice of required size in flow-controlling position, and a latch is provided for engagement with spaced grooves in the shaft. Another aim of the invention is to provide the casing with carrying means for said fixed collar and said latch, which will not interfere with tightening of the packing compressor of said bearing.

At least one of the openings in the valve disk is preferably provided with a bushing which may have a flow orifice of any desired size, and a still further object is to provide for removal of this bushing and substitution of another having a different size orifice, without disassembling the valve.

Yet another object is to make novel provision for feeding lubricant to the disk-engaging face of the annular seat, to not only insure easy turning of the disk thereon, but to assist in producing a fluid-tight seal between the disk and seat.

With the foregoing in view, the invention resides in the novel subject matter hereinafter described and claimed, description being accomplished by reference to the accompanying drawings.

Fig. 1 is a central vertical longitudinal sectional view partly in elevation.

Fig. 2 is a vertical transverse sectional view on line 2—2 of Fig. 1.

Fig. 3 is an inner side elevation of one side wall of the casing showing the seat ring and the shoulder for contact with the valve disk.

Fig. 4 is a side elevation of the valve disk.

In the drawings above briefly described, a preferred structure has been illustrated, and while this structure will be specifically explained, it is to be understood that minor variations may be made within the scope of the invention as claimed.

The valve disk is shown at 10, said disk being integral with a shaft 11 at one of its sides and at its opposite side being provided with a small central boss 12. Formed through the disk at circumferentially spaced points and spaced inwardly from the peripheral edge of said disk, are flow openings 13 of different sizes, and I prefer to provide at least one of these openings with a removable bushing 14 having a flow orifice 15 of any desired diameter. If no orifice in the disk 10 be of the requisite size, the bushing 14 may be removed and a bushing inserted having an orifice of the proper diameter, and due to provision hereinafter described, such interchange of bushings may be effected without disassembling the valve and without danger of either bushing dropping into the casing.

The disk 10 is within a casing 16 having a packed bearing 17 through which the shaft 11 passes, the packing being denoted at 18 and a compressing device for said packing being shown at 19. The casing 16 is preferably formed from two sections 20 and 21 secured together by bolts 22 with a packing ring 23 clamped between them. The section 20 forms one side wall of the casing and also the peripheral wall thereof, and the section 21 forms the opposite side wall of said casing. The section 21 is formed with an inlet 24, and section 20 is provided with an outlet 25, both threaded for engagement with fluid conducting pipes, said inlet and outlet being adapted for registration with any one of the flow openings 13 of the disk 10. A seat ring 26 is inset in a socket 27 in the side wall 20 of the casing 16 and is provided with a flat seating face 28 for fluid-tight contact with the flat side 10' of the disk 10, the space within said seat ring being in communication with the outlet 25. This seat ring is provided with lubricant conducting means hereinafter described to lubricate and seal the contacting faces of ring and disk.

The inner side of the wall 20 is provided with a circumferential step 29 which contacts solidly with the flat side 10' of the disk 10 when this disk is seated against the ring 26, so that said disk is solidly supported and cannot become sprung when it is forced against and held in contact with said ring 26, by the means hereinafter described. The step 29 contacts with the side 10' of the disk 10 between the openings 13 and the peripheral edge of said disk, and this disk is spaced from the inner side of the wall 20 of the casing between said step 29 and the shaft 11, providing a fluid-receiving chamber 30. The other side of the disk 10 is spaced from the casing side wall 21 to provide another fluid chamber 31 which communicates with the inlet 24, and the two chambers 30 and 31 are in communication with each other through the openings 13. Both sides of the disk 10 are thus subjected to the fluid pressure in such manner as to substantially balance said disk, insuring easy shifting thereof to and from seating position, and easy rotation for setting the disk with the proper orifice in communication with the inlet 24 and outlet 25.

Two yoke arms 32 are integrally or otherwise rigidly joined to the casing side wall 20 at opposite sides of the shaft 11, the inner ends of said arms straddling the packing compressing device 19 and being positioned so that they will not interfere with tightening of the adjusting nuts 33 for said compressing device. The outer ends of the arms 32 are integrally or otherwise rigidly joined to a fixed externally threaded collar 34 upon which a movable collar 35 is adjustably threaded, said collar 35 being rotatably mounted in any desired way upon the shaft 11. In the present showing, thrust collars 36 and 37 are suitably secured on the shaft at opposite sides of the collar 35 and ball bearings 38 are interposed between said collars 35, 36 and 37. Collar 35 is provided with a socket 39 or with other suitable means permitting engagement of a suitable tool therewith, for threading said collar either inwardly or outwardly. When this collar is threaded inwardly, it inwardly pushes the shaft 11, unseating the disk 10 from the seat ring 26, to allow easy turning of the shaft and disk to set the valve with the required orifice operatively positioned. Outward threading of collar 35 outwardly pulls the shaft 11, thereby shifting the valve disk 10 against and tightly holding it in contact with the seat ring 26. The outer end of shaft 11 may be squared or otherwise shaped as at 40, for engagement with a wrench or the like to be used in setting the valve.

A latch arm or pawl 41 is pivoted at 42 upon one of the yoke arms 32 and spring means 43 connects the other end of said latch arm or pawl with the other of said arms 32, said spring means serving to force the member 41 toward the shaft 11. This shaft is provided with a pluraltiy of peripheral grooves 44 exceeding by one the number of the openings 13, and the member 41 is provided with a detent 45 engageable with said grooves. The various grooves 44 may be numbered, and a code plate 46 may be secured to the exterior of the casing 16, giving the size of the orifice which will be operatively positioned, when detent 45 is in a groove having one number or the other. The extra groove, when engaged with the detent 45, insures that a blank or imperforate portion of the disk 10 shall span the seat ring 26 when said extra groove is engaged with the detent 45, so that the valve may be used to entirely cut off the flow as well as for the purpose of regulating flow.

The seating surface of the ring 26 is formed with a lubricant groove 47 of continuous form, and another lubricant groove 48 is formed in the periphery of said ring, the two grooves being connected by passages 49. A lubricant inlet port 50 in the casing section or wall 20 communicates with the groove 48 and is provided with a lubricant admitting nipple 51 for connection with a conventional grease gun or the like. By injecting grease into this nipple, the grooves 47 and 48, and the passages 49 are filled and it is thus insured that the contacting faces of ring 26 and disk 10 shall be effectively lubricated to allow easy operation of the valve and to assist in effecting a fluid-tight seal between the disk and seat ring.

The side wall or casing section 21 is formed with an opening 52 through which the bushing 14 may be removed, and the casing section or wall 20 is provided with a similar opening 53 through which a tool may be introduced to force said bushing out of its receiving opening 13. Both of these openings are normally closed by screw plugs 54. When the disk 10 is set to aline the bushing 14 with the openings 52 and 53 and the plugs 54 are removed, said bushing may be taken out and another having a flow orifice of desired size, may be inserted, the openings 52 and 53 being then again plugged. It will be observed that the disk 10 and the casing wall 21 are so closely spaced that a bushing being inserted or removed cannot accidentally drop into the casing.

When the shaft 11 is pulled outwardly by the collar 35 to forcibly seat the disk 10 against the ring 26, distortion or springing of this disk is prevented, due to solid seating thereof against the step 29, and this step is so positioned that it does not interfere with communication of the fluid chambers 30 and 31 through the openings 13, so as to substantially balance the valve. When shaft 11 is pushed inwardly by means of the collar 35, disk 10 is sufficiently freed from both 26 and 29 to allow easy rotation of the shaft and disk to any desired position, and said inward movement is limited by the hub or boss 12 striking the casing side wall 21. The grooved and numbered portions of the shaft 11 which coact with the pawl or latch 41, are exposed and readily visible between the yoke arms 32 and it will be observed that these arms do not interfere with tightening of the nuts 33 of the packing compressing device 19.

As excellent results are obtainable from the details disclosed, they may well be followed, but attention is again invited to the possibility of making variations within the scope of the invention as claimed.

I claim:—

1. In a disk valve, a casing having a packed shaft bearing and a packing compressor therefor, a valve disk in the casing having a shaft projecting rotatably through said bearing, two yoke arms at opposite sides of said shaft, said arms being rigidly joined at their inner ends to said casing and straddling said packing compressor, a fixed collar rigidly joined to the outer ends of said arms and encircling said shaft, a collar rotatably mounted upon said shaft and having an adjustable threaded connection with said fixed collar for shifting the shaft to seat and unseat said disk, a latch arm pivoted at one of its ends to one of said yoke arms and having a detent between its ends projecting toward said shaft, and spring means connecting the other end of said latch arm with the other of said yoke arms for swinging said latch arm toward the shaft, said shaft having circumferentially spaced grooves co-operable with said detent to hold the shaft in any one of various positions to which it may be rotated when setting said disk.

2. In a disk valve, a rotatably mounted disk having an opening from one of its sides to the other, a removable bushing in said opening, a casing having side walls at opposite sides of said disk and formed with an inlet and an outlet respectively for communication with said bushing, one of said side walls being provided with an opening through which said bushing may be removed and the other side wall having an opening for receiving a tool by which the bushing may be forced from the disk opening, the disk and said other side wall being so closely positioned that the bushing cannot fall between them when it is being forced from the disk opening into the bushing-removal opening, and means for normally closing said bushing-removal and tool-receiving openings.

BERT LAWRENCE PETERSON.